Feb. 5, 1957
W. A. BARNES
2,779,954
DOUBLE ACTION TRIMMER AND SURFACE PREPARATION
TOOL FOR SOLID PHASE BONDING
Filed June 25, 1953
2 Sheets-Sheet 1
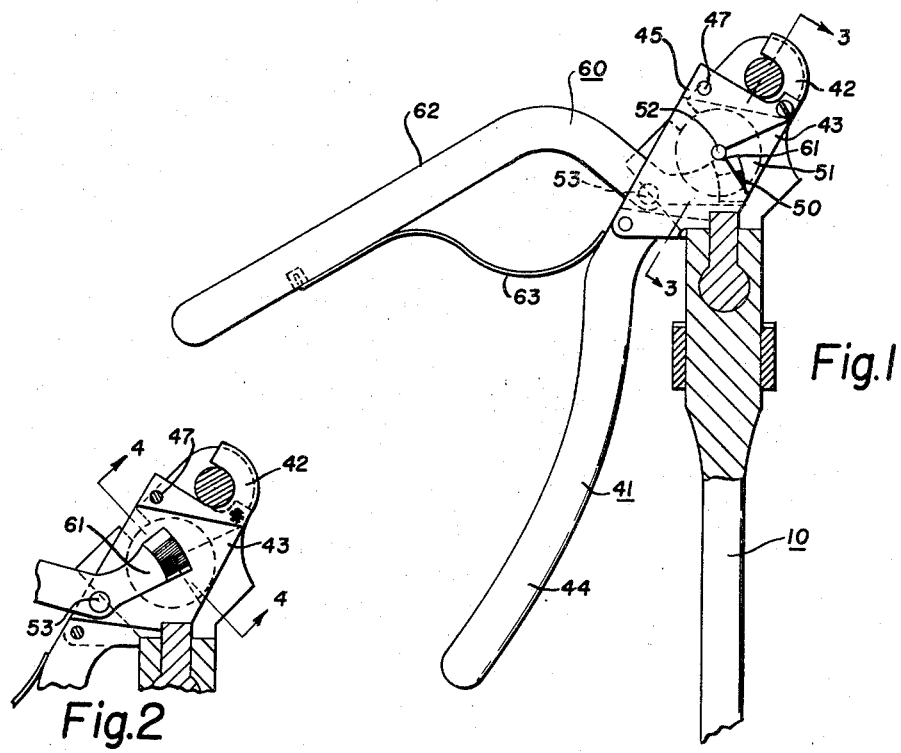
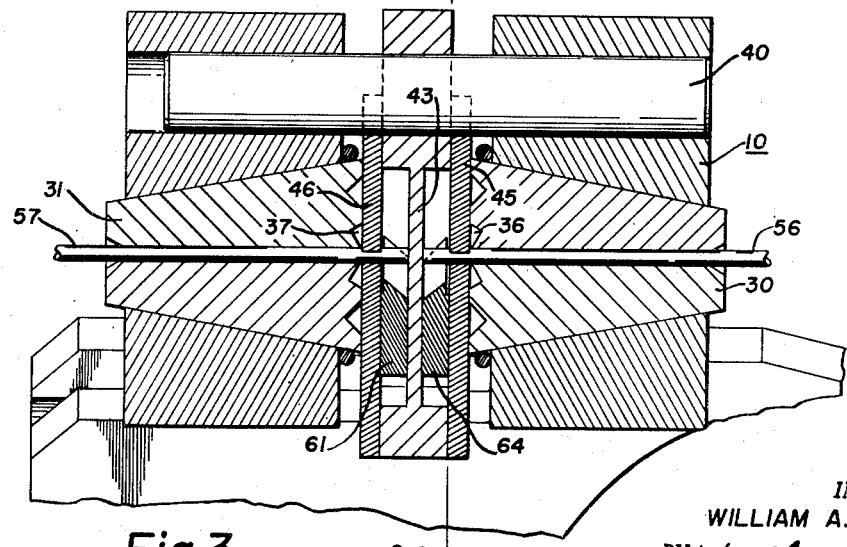
INVENTOR.
WILLIAM A. BARNES
BY Woodling and Krost
attys Feb. 5, 1957 W. A. BARNES 2,779,954
DOUBLE ACTION TRIMMER AND SURFACE PREPARATION
TOOL FOR SOLID PHASE BONDING
Filed June 25, 1953 2 Sheets-Sheet 2

INVENTOR.
WILLIAM A. BARNES
BY Woodling and Krost
attys

United States Patent Office 2,779,954
Patented Feb. 5, 1957

2,779,954

DOUBLE ACTION TRIMMER AND SURFACE PREPARATION TOOL FOR SOLID PHASE BONDING

William A. Barnes, Utica, N. Y., assignor to Utica Drop Forge & Tool Corporation, a corporation of New York Application June 25, 1953, Serial No. 364,153

6 Claims. (Cl. 7—5.6)

This invention relates generally to the solid phase bonding of metal members at temperatures less than normal welding temperature under conditions of confined flow under high pressure, and relates more specifically to a cut-off blade construction and blade surface for shearing the ends of workpieces and conditioning the sheared ends for best solid phase bonding.

This application is a continuation-in-part of application Serial No. 348,069, entitled "Cold Weld Butt Tool," filed April 10, 1953.

In the parent application, Serial No. 348,069, there is shown, described, and claimed, a cold weld butt tool having a first and a second workpiece holding an upset die relatively movable toward one another to drive the workpieces together under high pressure conditions of confined flow, with the provision of a spacing and surface preparation tool for preparing workpieces to be joined by a solid phase bond at a temperature less than normal welding temperature. The tool for so preparing the workpieces having a first shear means and a second shear means, and with blocking means positioned between the first and second shear means whereby a single workpiece cannot be extended across both of the shear means.

This case teaches a further embodiment of that tool used for preparing the workpieces to be joined by a solid phase bond, for example in the tool shown and described in application Serial No. 348,069. The tool in general respects is similar to the tool illustrated in the parent case. However, the present invention teaches the discovery that in the surface preparation of metals or alloys in preparation for the uniting of workpieces by a solid phase bond, the best bond, or weld, results are secured between clean amorphous surfaces which have had the metal thereof dragged or galled.

This invention is not so much a departing from the normal conventional cutting operation as in the provision of a succession of operations which better prepares the metal for welding than one operation can do. A single cutting operation on a large workpiece such as a wire, tends to push in or flatten and to round the edge of the initial cut. This condition is corrected by the teaching of the present invention in the provision of a multiplicity of cutting edges, preferably cutting in random directions or actually reversed from one another. Also, the invention involves the utilization of the face of the cutting blade which rubs against the cut surface to further prepare the freshly cut area suitable for solid phase bonding.

Therefore, an object of this invention is to provide a tool which will produce a true sheared end on a workpiece.

Another object of this invention is to provide such tool with a sequence cutting action to produce a series of cuts and to produce a finishing action to the cut surface.

Still another object of this invention is to provide a shear blade with a cutting edge and a face, with the face disposed to rub the sheared surface.

Yet another object of this invention is to adapt the face of the shear blade to prepare the exposed surface suitable for welding cold, the adaptation being by making the face rough or conditioned to gall the exposed surface.

Other objects and a fuller understanding of the invention may be had by referring to the following description and claims, taken in conjunction with the accompanying drawings, in which:

Figure 1 is a side view of a hand powered shear tool embodying the principles of this invention, the tool being associated with a butt welding tool, a part of which is shown in section;

Figure 2 is a view similar to Figure 1 and taken on line 2—2 of Figure 3 with one anvil shear plate removed to show the active shearing members of the tool;

Figure 3 is an enlarged sectional view taken along line 3—3 of Figure 1;

Figure 4:
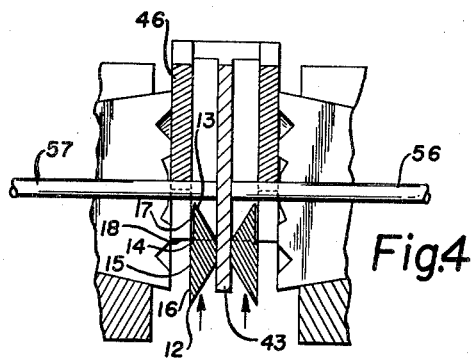
Figure 5:
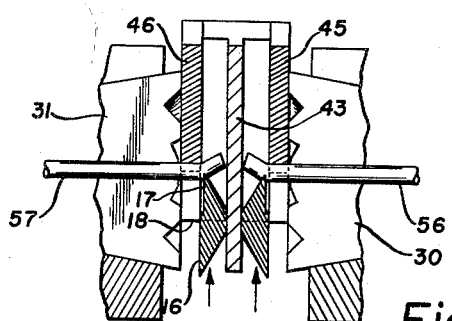
Figure 6:
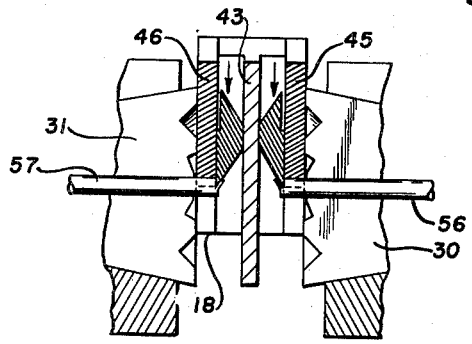
Figure 7:
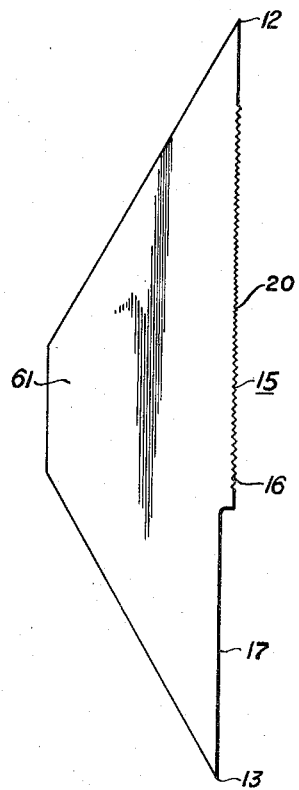

Figures 4, 5, and 6 are sectional operating views taken along line 4—4 of Figure 2; and Figure 7 is an enlarged profile of a cutting shear blade showing an embodiment of the invention.

In the drawings, there is illustrated so much of a butt weld tool 10 of the parent application, Serial No. 348,069, as is necessary to show an environment for the use of the illustrated embodiment of the invention. It is to be clearly understood that the teaching of the present invention, as broadly set forth herein and specifically illustrated in the form of a particular tool, is not limited to the one particular embodiment but is to be limited only by the claims appended hereto.

In the butt weld tool 10 there are provided split dies designed and adapted to grip two workpieces, the illustrated embodiment of workpiece being wires 56 and 57, and to drive the ends of those wires 56 and 57 together under confined flow and high pressure to produce a solid phase bond at a temperature less than the normal welding temperature of the particular workpieces. In producing a solid phase bond at cold temperatures, the ends of the workpieces are upset into suitable upset cavities 36 and 37 on the faces of split dies 30 and 31. Also, the split dies are conveniently guided by a dowel guide pin 40. Although not essential to the operation of the illustrated embodiment of a weld tool associated with the present invention, the dowel pin 40 is a convenient pivot member upon which to anchor the illustrated embodiment of the surface preparation tool.

As previously indicated, the butt weld tool 10 is intended primarily for driving the ends of two workpieces, such for example as aluminum or copper wires, together under controlled conditions to cause the wires to cold weld. However, in order to cause a proper welding, the surfaces being joined must be thoroughly cleaned and properly conditioned. It has been discovered that a rough, or galled condition is the most satisfactory, wherein the crystalline structure is in a condition which may be referred to as amorphous, such as that condition which is produced by scratch brushing. Other means, it has been found, is to rub a freshly cut surface under moderately high pressure with the same type of metal as the workpiece which has been cut, or with a particular material which will gall the metal in the same manner. It is well known that bearings should be made of different materials in order to reduce the tendency to gall. Likewise, certain compatible metals are to be avoided in bearing structures because of their tendency to gall. In this invention, those materials which will tend to gall are deliberately employed for the purpose of causing a galling of the workpiece surfaces. An abrasive, file, or wire scratch brush surface may be provided to do substantially the same job.

The wires 56 and 57 employed in this case as examples of workpieces must be clamped by the split dies 30 and 31 with the wire projecting from the face thereof an exact distance sufficient to cause a proper flow of the metal in the upset cavities 36 and 37. There must not be too much wire or too little wire, and the amounts must be equally divided between the two wires being joined for like materials. When joining unlike materials, the ratios are suitably divided. Furthermore, the ends of the wires which abut must be absolutely clean and free of any oxide and contaminating film, and in addition, will be in better condition for producing a good union if scratch brushed or galled.

In order to assure an exact proper spacing and relationship of wires 56 and 57 with one another and in respect to their particular split die, and also to condition the ends of the wires, the tool 41 is provided to not only cut the ends of the wire to proper length, but is adapted to condition the ends of the wires according to the teaching of this invention.

The tool 41 in the form illustrated to operate in conjunction with butt weld tool 10, has a hook 42 to catch around the guide dowel pin 40. The dowel pin 40 then serves as a pivot point and anchor to properly guide the tool 41 and hold it firmly in proper position between the split dies 30 and 31. In the construction of the tool 41 as illustrated, the hook 42 is an integral part of a handle 44. A section of reduced width between the hook 42 and the handle 44 serves as a bumper plate 43. In other words, the handle and hook are made of a wide piece of stock, and a portion is removed to produce a narrow plate portion 43. The hook serves as a convenient guide for positioning the bumper plate 43 between the dies 30 and 31, and the handle 44 serves as a holding means.

The bumper plate 43 whether constructed in one piece with the hook and handle as illustrated, or separately fabricated, nevertheless is so provided to block passage between dies 30 and 31. The wires 56 and 57 are inserted from the rear of the dies 30 and 31 and it has been found that operators of this type of mechanism may thrust one of the wires almost against the face of the opposite side. Consequently, the wire coming through from the other die projects a very short distance. The bumper plates 43 assure an even distribution and proportioning of the workpiece, and insure that both workpieces will be trimmed and conditioned by the tool 41.

The tool 41 is provided with oppositely disposed cutter anvil plates 45 and 46 secured to the handle 44 by means of rivets 47. The plates 45 and 46 bridge across a part of the wide hook 42 and a part of the wide handle 44 over the section of reduced width and therefore define slotted chambers in conjunction with the opposite side of bumper plate 43.

Each of the cutter anvil plates is provided with a cutting notch 50 having a wide guiding entrance mouth 51 and having an apex formed as a cutting die portion indicated by the reference character 52.

The shearing action is provided by a shear 60 having spaced shear blades 61 and 64 operating within the space between the anvil plate and the surface of bumper plate. A handle 62 provides for actuation of the blades. A common pivot pin 53 extends through both anvil plates 45 and 46, through both shear blades 61 and 64, and through the bumper plate 43 to give a strongly constructed pivot about which the shear 60 may operate.

In operation, the tool 41 is hooked under the dowel pin 40 and pivoted into a rest position as illustrated in Figure 1 against the bed of the tool 10. In this position, the tool 41 is held in a tightly fixed relationship with respect to the tool 10.

When held firmly as illustrated in Figure 1, the bumper plate 43 will prevent the extension of the wires 56 and 57 beyond their desired limits. After the wires have been advanced against the bumper plate 43, and the dies 30 and 31 preliminarily clamped upon the wires, the handle 62 is depressed against the urge of a convenient spring 63 to shear the ends of the wires 56 and 57.

Because the tool 41 is designed to cut and prepare the adjacent ends of two wires in axial alignment, there are two sets of blades and anvils. In order to expedite the explanation of the present invention, the following description will be confined to the shear blade 61 and the anvil shear plate 46.

The shear blade 61 has a sharp cleavage edge 12, a side face 15, and a second sharp shear edge 13. The anvil shear plate 46 is preferably formed with a blunt surface 18 having a shear edge 14 in order to act as a holding anvil and cause the workpiece and the edge 14 to remain relatively fixed with respect to one another rather than to have the edge 14 cut into the workpiece. Thereby, the face 15 of the blade 61 will move relative to the end of the workpiece that is sheared by the edges 12 or 13.

The side face 15 of the shear blade 61 is disposed to rub against a workpiece surface exposed by a shear edge thereof and is further adapted to roughen the exposed surface suitable for welding cold.

The word "roughing" is used generically to convey the meaning that the end surface of the workpieces are scraped, rubbed, galled, or otherwise conditioned by a rubbing action to produce a roughened amorphous surface rather than a broken or smoothly ironed surface.

It has been found that a good square cut is exceedingly difficult to make in one cutting operation. Therefore, the side face 15 is preferably divided into a first face portion 16 and a second face portion 17. The first and second face portions 16 and 17 lie in laterally spaced relationship and, therefore, have a shoulder therebetween.

The first face portion 16 ends in the sharp cleavage shear edge 12 and the second face portion 17 ends in the second sharp cleavage edge 13. The edges 12 and 13 are therefore positioned to cut in opposite directions of movement of the shear member 61.

Both the face portions 16 and 17 will pass in shearing relationship with respect to the shearing edge 14 of the anvil shear plate 46, but the face portion 17 is spaced from the shear plate 46 whereas the face portion 16 contacts the plate 46 and rubs along the edge 14.

When the handle 62 is pressed against the force of spring 63, the blade 61 moves in the direction indicated by the arrows in Figures 4 and 5, and the shear edge 13 forms a rough cut through the wire 57 to trim that wire close to its intended length. The space relationship of face portion 17 will allow a small amount of metal for trimming and conditioning later. Upon release of the handle 62, the spring 63 will cause the direction of the movement of blade 61 to reverse, as illustrated by the arrows in Figure 6 of the drawing, and cause the sharp cleavage edge 12 to pass close to the edge 14 and trim the slight amount of metal remaining on the end of the wire 57.

In the first direction of movement, wherein a slight amount of metal remains on the end of the wire 57, the face portion 17 can pass easily over the cut end of wire 57, but a slight rubbing and wedging condition will result in forcing the face portion 16 past the edge. Upon returning in the reverse direction, the face portion 16 will against rub the freshly sheared surface removed by the sharp cleavage edge 12.

It is the rubbing action of face portion 16 against the closely shaved end of the workpiece on the return movement which conditions the end of the workpiece after having been cut square and clean by the double action cutting produced by the cooperation of edges 12 and 13 as described.

It has been found that an exceptionally desirable and workable surface condition can be produced by the rubbing of the face portion 16 along the closely shaved fresh surface when moved in the reverse direction as shown in Figure 6. One convenient method of producing a galled and roughened edge is to provide file teeth 20 as shown in Figure 7. This is a mechanical method of approximating a hand operated scratch brush surface. An abrasive surface may be substituted in place of the cut file teeth 20.

However, an extremely efficient and desirable method of producing good surface conditions has been found by providing at least the face surface of the face portion 17 of a metal adapted to gall a workpiece of a selected metal. For example, a tool used primarily with copper workpieces may be surfaced with copper or provided with a copper insert. A tool intended primarily for aluminum workpieces can be provided with an aluminum coating or an aluminum insert in the face portion 17.

However, it is not always necessary to use the same metal as the workpiece to produce the particular galling action. There are several metals which have been found to have galling action when rubbed against copper and aluminum. These particular metals are titanium, zirconium, tungsten, and molybdenum. These metals, or alloys containing a considerable portion of these metals, will also produce a galling action to various degrees. Undoubtedly, for particular workpieces, other metals may be found to be serviceable. This disclosure is intended to list only those metals which have thus far been actually found to be serviceable, with the intention of teaching the facts that these and other metals can produce that action. It is the recognition of the fact that a particular galling metal surface can be provided for the face portion 17 that is believed to be the invention, rather than merely the specific metals which have thus far been found experimentally to be satisfactory.

To be certain that the terms used herein are fully understood, attention is called to the fact that the descriptive phrase "solid phase bond" is used as the only known term to define a union which is made by ramming metal pieces together under confined flow at a high pressure. Heat is not usually necessary, but may be used to advantage with some types of metals. However, the heat is not such that a weld would result in the absence of high pressure and confined flow. Therefore, it may be referred to as welding at a temperature less than normal welding temperature.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool for preparing workpieces to be joined by a solid phase bond at a temperature less than normal thermo welding temperature, said tool comprising, a shear blade and a shear anvil, said blade having a stepped shear face with cutting edges staggered laterally to cut in adjacent planes, said cutting edges including a leading cutting edge and means to drive said blade past said anvil in a shearing path, said cutting edges being longitudinally spaced with respect to the said shearing path and said leading cutting edge spaced in said shearing path a distance from said anvil.

2. A tool for preparing workpieces to be joined by a solid phase bond at a temperature less than normal thermo welding temperature, said tool comprising, a shear blade and a shear anvil, said blade having a first and a second shear edge staggered laterally to cut in closely adjacent planes, and means to drive said blade past said anvil in a shearing path, said first and second shear edge being longitudinally spaced with respect to the said shearing path, said first shearing edge spaced from said anvil a distance greater than said second shear edge.

3. A tool for preparing workpieces to be joined by a solid phase bond at a temperature less than the normal thermo welding temperature, said tool comprising, a shear blade and a shear anvil, means to drive said blade in first and second opposed directions past said anvil in a shearing path, said blade having a stepped shear face with cutting edges staggered laterally to cut in adjacent planes, said cutting edges including a first leading cutting edge to cut in said first direction and a second leading cutting edge to cut in said second direction, said cutting edges being longitudinally spaced with respect to said shearing path, and said leading cutting edges spaced in said shearing path a distance from said anvil.

4. A tool for preparing workpieces to be joined by a solid phase bond at a temperature less than normal thermo welding temperature, said tool comprising, a shear blade and a shear anvil, said blade having a stepped shear face with cutting edges staggered laterally to cut in adjacent planes, said cutting edges including a leading cutting edge and means to drive said blade past said anvil in a shearing path, said cutting edges being longitudinally spaced with respect to the said shearing path and said leading cutting edge spaced in said shearing path a distance from said anvil at least a portion of said face being shaped to move in the plane of the last cutting edge and thereby rub against the surface cut thereby.

5. A tool for preparing workpieces to be joined by a solid phase bond at a temperature less than normal thermo welding temperature, said tool comprising, a shear blade and a shear anvil, said blade having a stepped shear face with cutting edges staggered laterally to cut in adjacent planes, said cutting edges including a leading cutting edge and means to drive said blade past said anvil in a shearing path, said cutting edges being longitudinally spaced with respect to the said shearing path and said leading cutting edge spaced in said shearing path a distance from said anvil at least a portion of said face being shaped to move in the plane of the last cutting edge and thereby rub against the surface cut thereby, said portion of the face having a file surface adapted to gall a workpiece end sheared by said blade.

6. A tool for preparing workpieces to be joined by a solid phase bond at a temperature less than normal thermo welding temperature, said tool comprising, first and second cooperating shear members, said first shear member having a side face divided into a first face portion and a second face portion, said first and second face portions lying in laterally spaced relationship with a shoulder therebetween, said first face portion ending in a first sharp cleavage shear edge, said second face portion ending in a second sharp cleavage edge, said first and second cleavage edges disposed to cut in opposite directions of movement of said first shear member, said second shear member having a shear edge, means to hold a workpiece in substantially fixed relationship with respect to said shear edge of said second shear member, said side face of the first shear member and said shear edge of said second shear member passing in shearing relationship with said first face portion spaced from said second shear member and said second face portion contacting said second shear member, said first and second shear members passing in a first direction with the first sharp cleavage shear edge and first face portion leading, and in a reverse second direction with the second sharp cleavage shear edge and second face portion leading, said second face portion disposed to rub against a workpiece surface exposed by the shear edges of said first shear member, whereby said second face portion may be utilized to prepare the workpiece surface for welding.

References Cited in the file of this patent

UNITED STATES PATENTS

| 13,570 | Grover | Sept. 18, 1855 |
| 54,520 | Flinn | May 8, 1866 |
| 187,601 | Clune | Feb. 20, 1877 |
| 304,089 | Entrepin | Aug. 26, 1884 |
| 372,560 | Overstreet | Nov. 1, 1887 |
| 2,018,185 | Morton | Oct. 22, 1935 |
| 2,579,773 | Williams | Dec. 25, 1951 |

FOREIGN PATENTS

| 185,575 | Germany | May 27, 1907 |